No. 854,549. PATENTED MAY 21, 1907.
C. L. WILLIAMS.
TIRE FASTENER.
APPLICATION FILED OCT. 29, 1906.
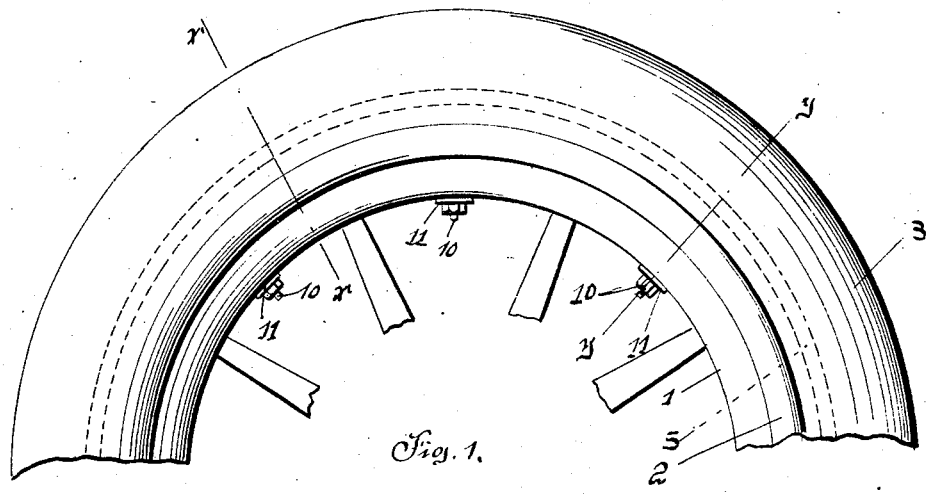
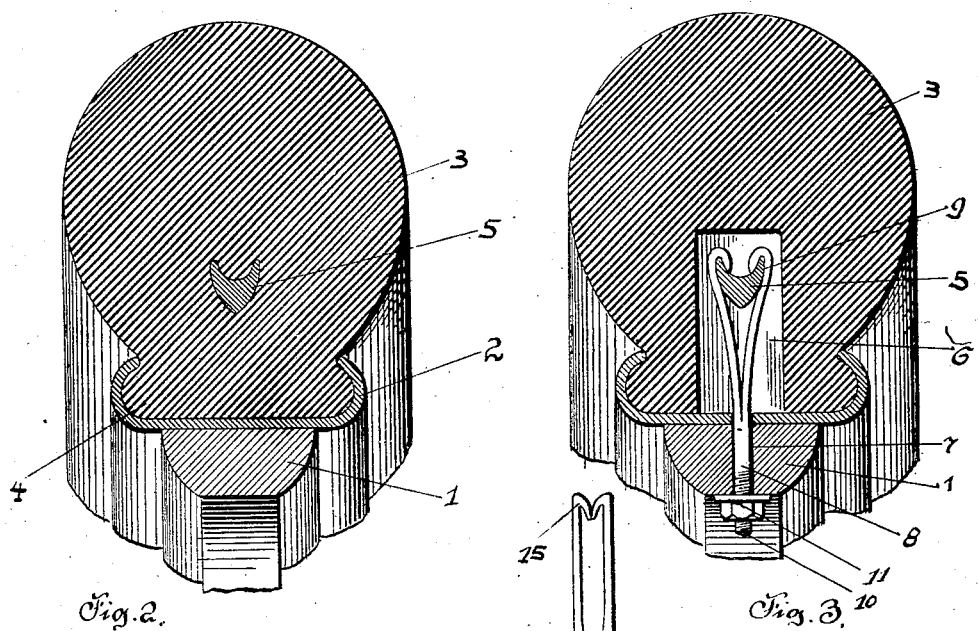
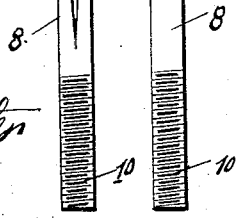
WITNESSES:
C. Klostermann
R. H. Butler
INVENTOR
Cortez L. Williams
By H. C. Evert & Co.
Attorneys

UNITED STATES PATENT OFFICE.

CORTEZ L. WILLIAMS, OF STEUBENVILLE, OHIO.

TIRE-FASTENER.

No. 854,549.  Specification of Letters Patent.  Patented May 21, 1907.

Application filed October 29, 1906. Serial No. 341,011.

*To all whom it may concern:*

Be it known that I, CORTEZ L. WILLIAMS, a citizen of the United States of America, residing at Steubenville, in the county of Jefferson and State of Ohio, have invented certain new and useful Improvements in Tire-Fasteners, of which the following is a specification, reference being had therein to the accompanying drawings.

This invention relates to tires designed for automobiles and similar motor driven vehicles, and the invention relates more particularly to novel means for securing a tire to the rim or felly of a wheel.

My invention aims to provide a novel form of solid resilient tire, and novel means whereby the tire can be easily and quickly secured to the rim or felly of the wheel. In this connection, I have devised a simple and inexpensive fastening means applicable to various types of wheels to which my improved tires can be applied. To this end, I have devised a solid rubber tire in which are embedded circumferentially arranged rod-like pieces of metal having longitudinal channels in their outer faces. The tire is provided with equally spaced recesses or openings through which the rod-like metal pieces are passed, and into which my improved tire fasteners extend and grip the pieces of metal embedded within the tire, said fasteners protruding through the felly or rim of the wheel and firmly holding the tire thereon.

The detailed construction of my improved tire will be presently described and then specifically pointed out in the appended claims. Referring to the drawing forming part of this specification, like numerals of reference designate corresponding parts throughout the several views, in which:—

Figure 1 is an elevation of a portion of a wheel constructed in accordance with my invention, Fig. 2 is a cross sectional view enlarged taken on the line x—x of Fig. 1, Fig. 3 is a similar view enlarged taken on the line y—y of Fig. 1, Fig. 4 is a front elevation, and Fig. 5 is a side elevation, of one of the fasteners, Fig. 6 is a front elevation of a modified form of tire fastener.

In the accompanying drawings, I have illustrated a portion of the felly 1 of a wheel carrying a conventional form of "clencher" rim 2 and upon said rim is supported my improved resilient tire 3. The tire is substantially circular in cross section, and is provided with a flat beaded side 4 adapted to fit within the clencher rim 2 of the wheel. The tire is preferably constructed of rubber or similar resilient material, and approximately central of the tire, I embed rod-like strips of metal 5, said strips of metal extending around the tire and formed with longitudinal channels in their outer faces.

At equally spaced points throughout the inner circumference of the tire, I provide recesses or openings 6, said recesses being intersected by the strips of metal 5. The rim 2 and the felly 1 adjacent to each recess is provided with openings 7, and adapted to pass through said openings are split bolts 8 threaded at one end as at 10. The terminals of the split portion of the bolts are inclined inwardly and toward the threaded ends and form hook-shaped gripping ends 9 and hook shaped ends engaging the channels of the strips of metal 5, while a nut and washer 11 are placed upon the threaded end 10 to bind the tire rim and felly firmly together.

When the split bolts 8 are inserted in the opening 7 and impinge on the strips of metal 5, the beveled sides of the strips of metal separate the resilient hook-shaped gripping ends 9 of the bolts 8, and as said bolts are forced inwardly they eventually grip the outer channel edges of the strips of metal 5, and when the nuts 11 are placed in engagement with the bolts, said bolts will be drawn inwardly to firmly clamp the tire upon the rim 2 of the wheel.

In Fig. 6 of the drawing, I have illustrated a fastening bolt made of two interlocking sections 14 having hook-shaped gripping ends 15 similar to the bolts 8. The two-part sectional bolt can be readily used in a similar manner to the bolts 8, the openings formed in the felly or rim of a wheel together with the nut mounted upon the threaded end of the bolt tending to hold the two sections together, while the serrated or toothed joining edges of the sections prevent longitudinal displacement.

I do not care to confine myself to the type of wheel or rim in connection with which my improved tire is used, or to the material from which the same is made. Such other changes in the size, proportion and minor details of construction as are permissible by the appended claims, may be resorted to without departing from the spirit and scope of the invention.

What I claim and desire to secure by Letters Patent, is:—

1. A wheel including a rim, a tire of flexible material bearing upon said rim and provided with spaced recesses in its inner face, rods embedded in said tire and extending through said recesses and with longitudinal channels in their outer faces, fastening devices consisting of split rods threaded at one end and with the terminals of the split portions inclined inwardly and toward the threaded ends thereof, said rods adapted to pass through the rim at their threaded ends and to enter the recesses in the tire at their split portions and bear by their hooked terminals in the channels of the embedded rods, and clamp nuts engaging the threaded portions of the rods and operating to clamp the same to the wheel.

2. A wheel including a rim, a tire of flexible material bearing upon said rim and provided with spaced recesses in its inner face, rods embedded in said tire and extending through said recesses and with longitudinal channels in their outer faces, fastening devices consisting of rods divided longitudinally and with the adjacent faces serrated near one end and threaded externally of the serrated portion and with the other terminals inclined inwardly and toward the threaded terminals, said divided rods adapted to pass through the rim at their threaded ends and to enter the recesses in the tire at their other ends and bear by the hooked terminals within the longitudinal channels of the embedded rods, and clamp nuts engaging the threaded portions of the rods and operating to clamp the same to the wheel.

3. A wheel including a felly and a rim bearing upon the felly, a tire of flexible material bearing upon said rim and provided with spaced recesses in its inner face, rods embedded in said tire and extending through said recesses and with longitudinal channels in their outer faces, fastening devices consisting of split rods threaded at one end and with the terminals of the split portions inclined inwardly and toward the threaded ends thereof, said rods adapted to pass through the rim and felly at their threaded ends and to enter the recess in the tire at their split portions and bear by their hooked terminals in the longitudinal channels of the embedded rods, and clamping nuts engaging the threaded portions of the fastening devices and bearing upon the inner faces of the felly.

In testimony whereof I affix my signature in the presence of two witnesses.

CORTEZ L. WILLIAMS.

Witnesses:
   JOHN A. HUSTON,
   NELSON D. MILLER.